April 30, 1957 — L. G. REED — 2,790,536
STORAGE BATTERY PLATES AND SEPARATOR ASSEMBLY MACHINE
Filed Feb. 23, 1954 — 11 Sheets-Sheet 1

INVENTOR.
LELAND G. REED
BY Hazard & Miller
ATTORNEYS

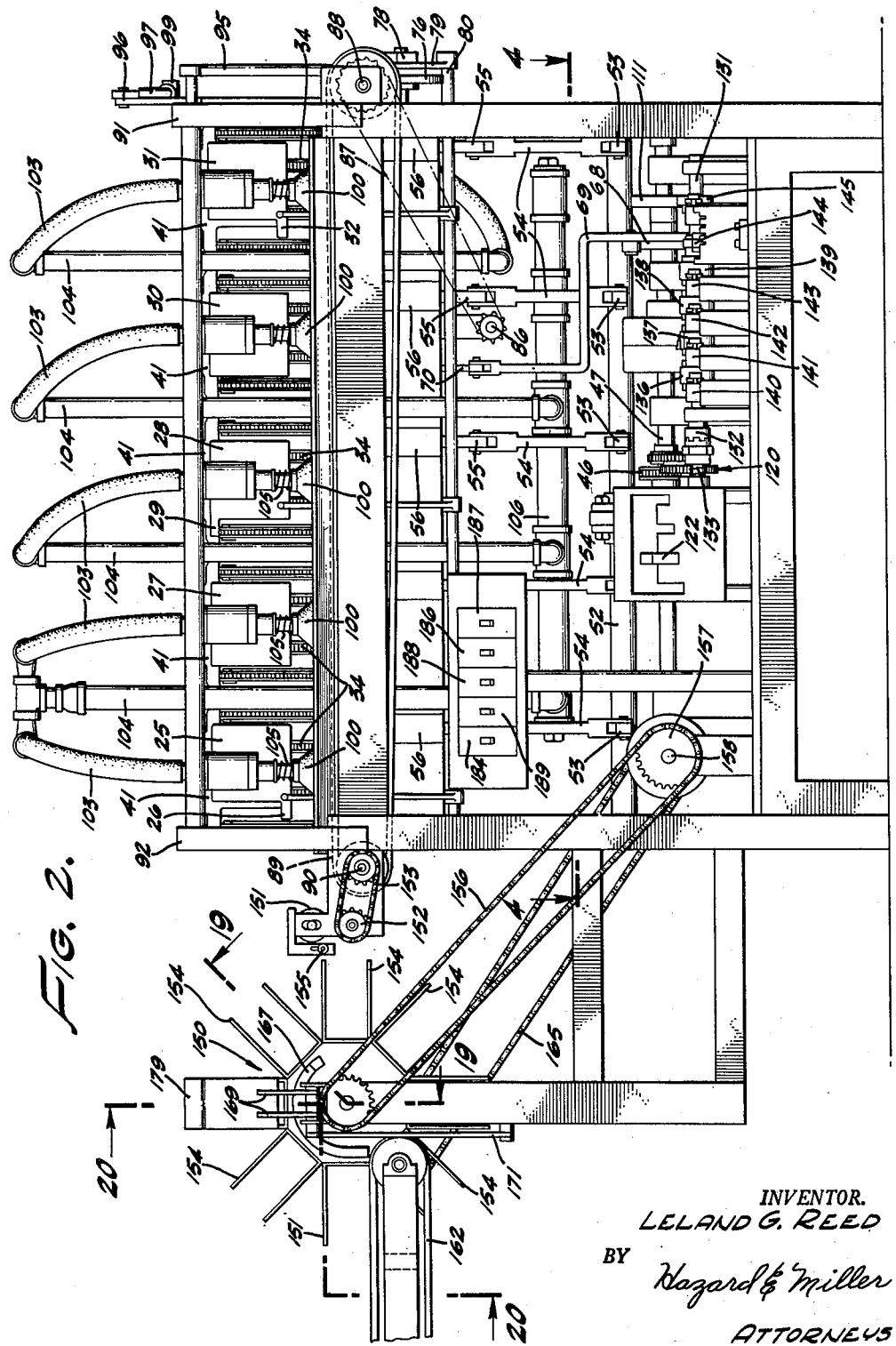

April 30, 1957 L. G. REED 2,790,536
STORAGE BATTERY PLATES AND SEPARATOR ASSEMBLY MACHINE
Filed Feb. 23, 1954 11 Sheets-Sheet 3

INVENTOR.
LELAND G. REED
BY
Hazard & Miller
ATTORNEYS

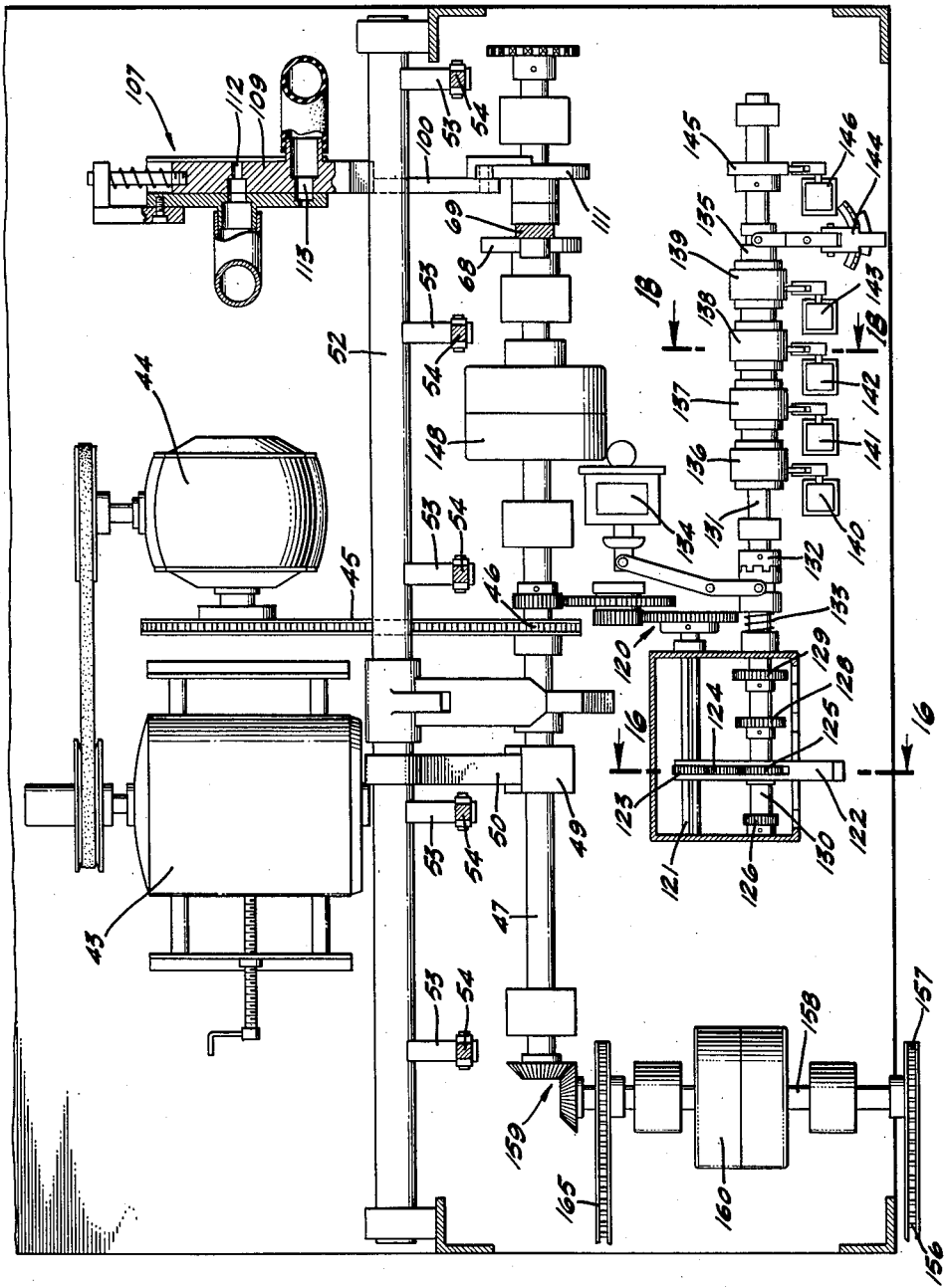

April 30, 1957 L. G. REED 2,790,536
STORAGE BATTERY PLATES AND SEPARATOR ASSEMBLY MACHINE
Filed Feb. 23, 1954 11 Sheets-Sheet 5
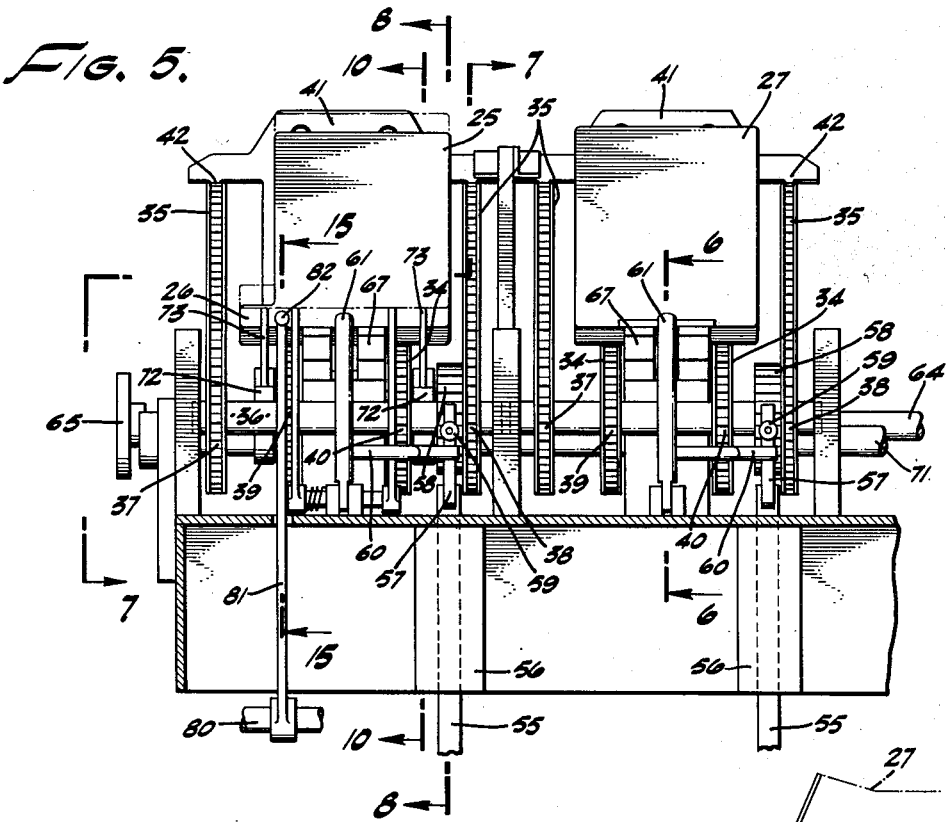
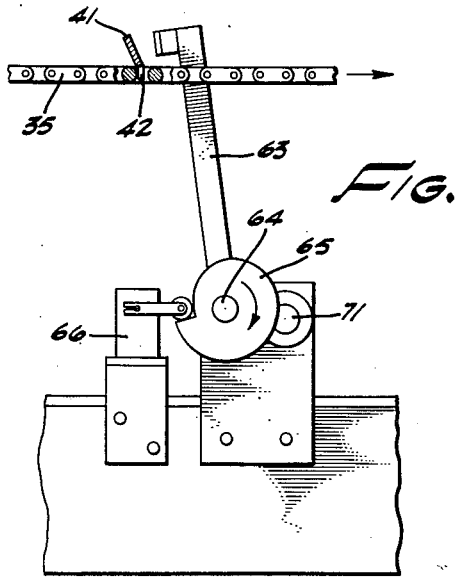
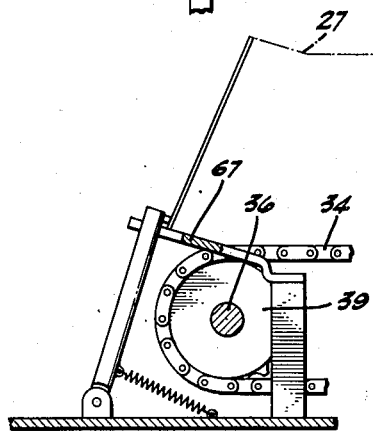
INVENTOR.
LELAND G. REED
BY Hazard & Miller
ATTORNEYS

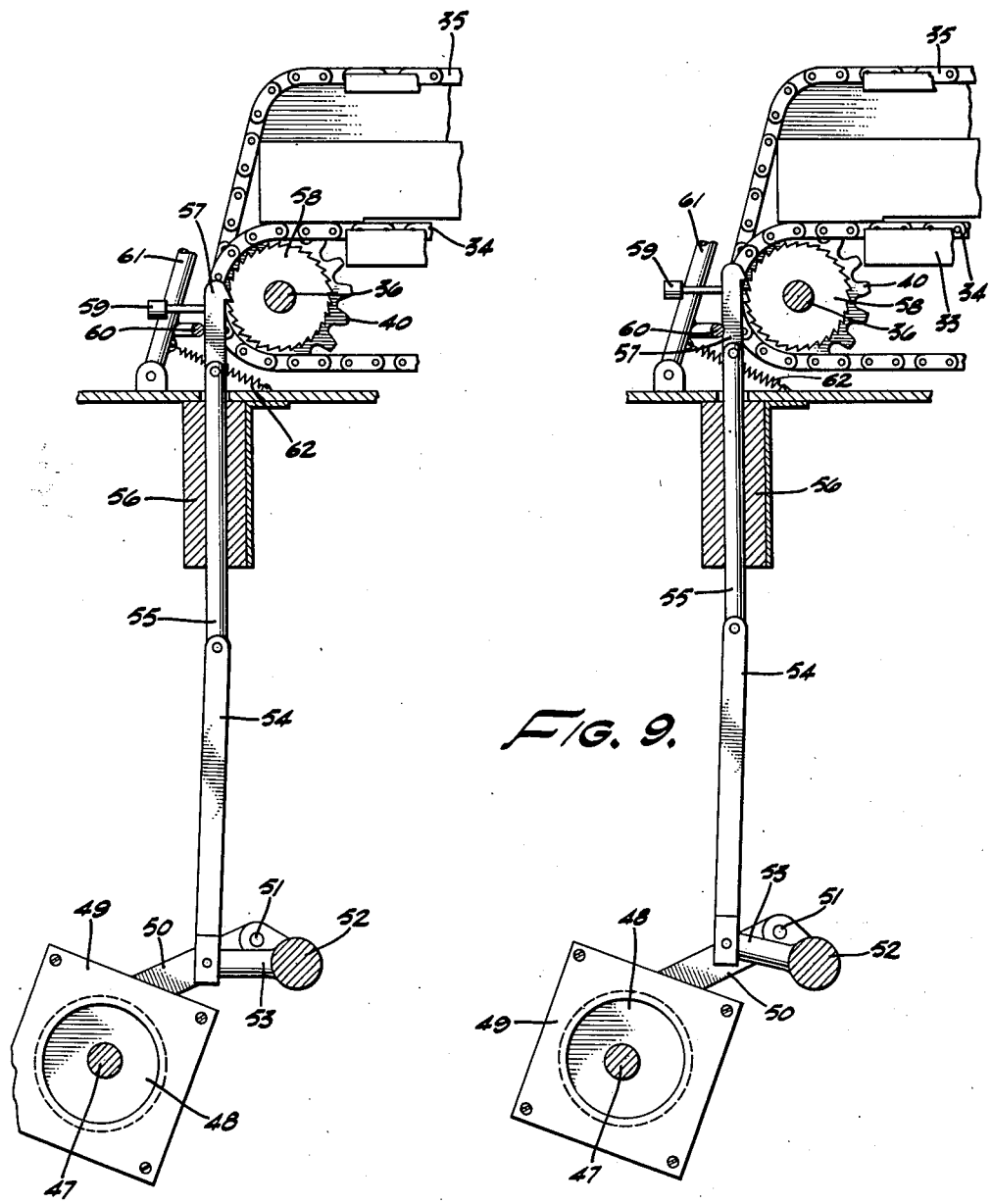

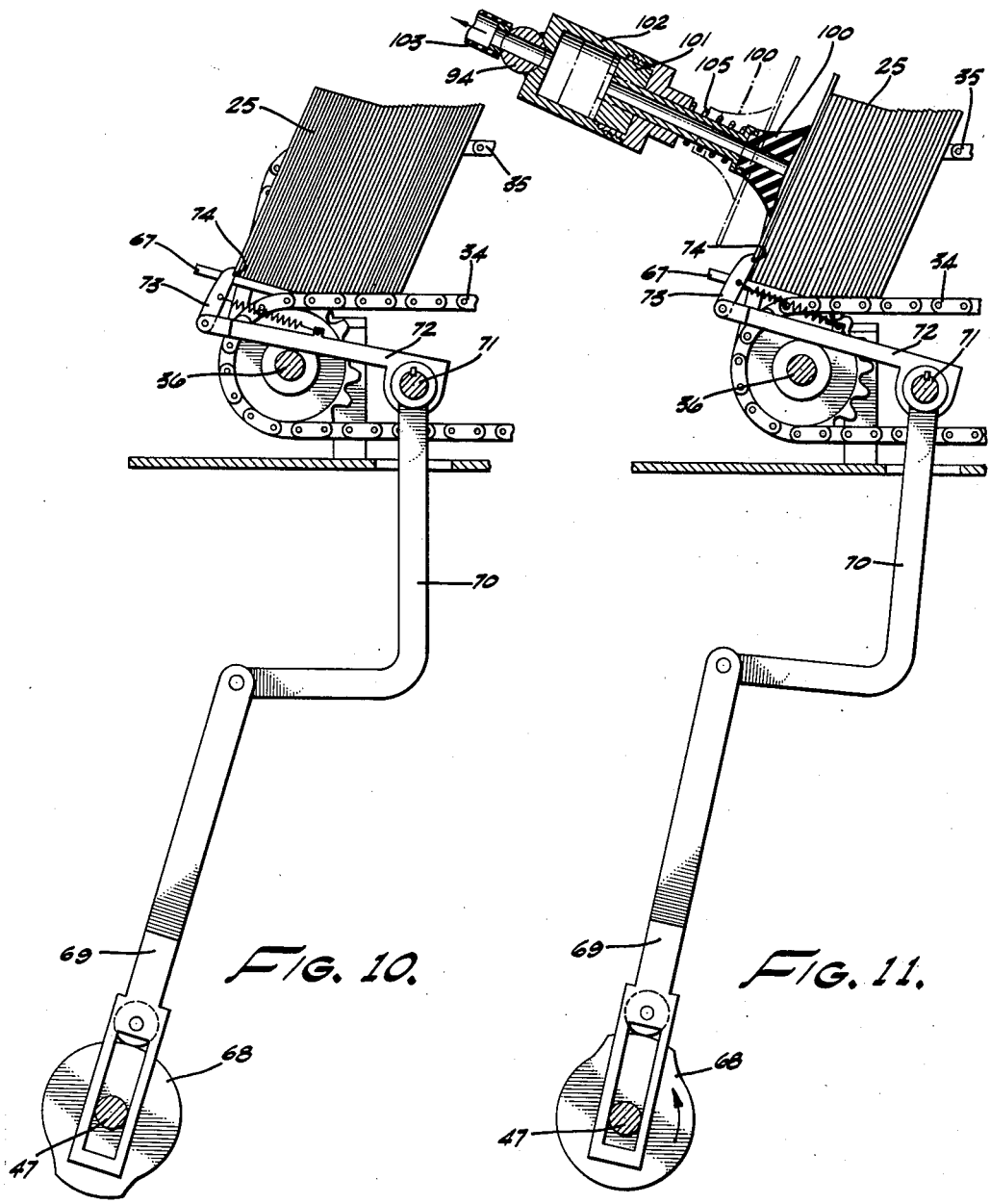

INVENTOR.
LELAND G. REED
BY
Hazard & Miller
ATTORNEYS

April 30, 1957 L. G. REED 2,790,536
STORAGE BATTERY PLATES AND SEPARATOR ASSEMBLY MACHINE
Filed Feb. 23, 1954 11 Sheets-Sheet 9
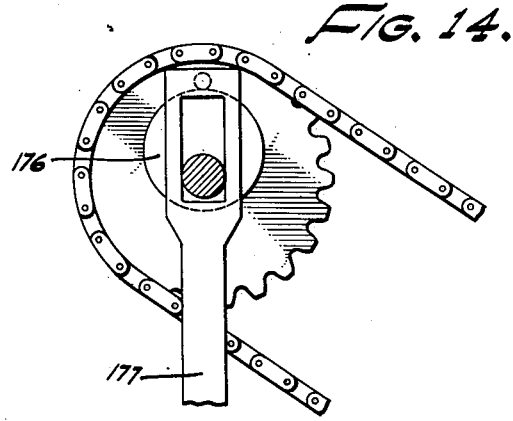
FIG. 14.
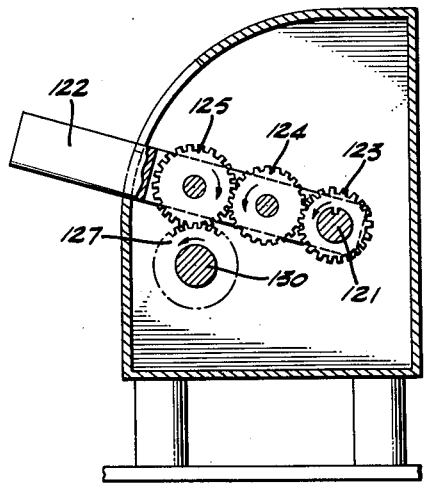
FIG. 16.
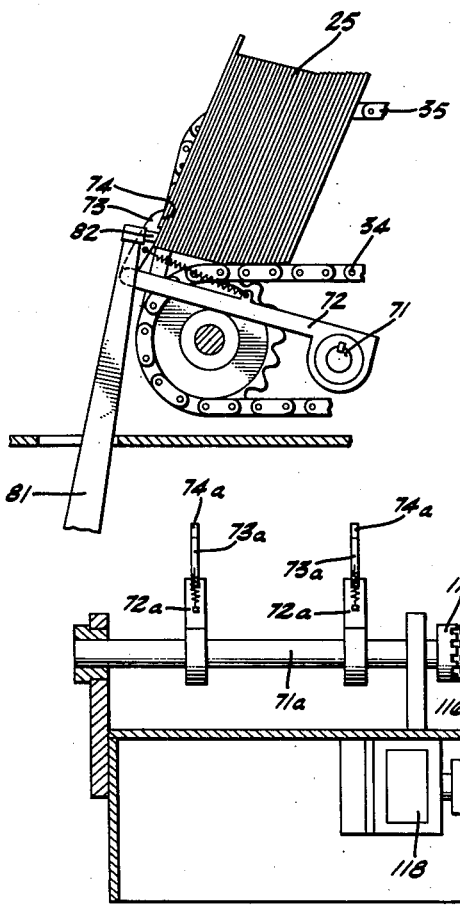
FIG. 15.
FIG. 17.
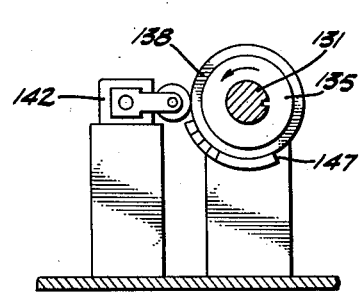
FIG. 18.
INVENTOR.
LELAND G. REED
BY Hazard & Miller
ATTORNEYS April 30, 1957 L. G. REED 2,790,536
STORAGE BATTERY PLATES AND SEPARATOR ASSEMBLY MACHINE
Filed Feb. 23, 1954 11 Sheets-Sheet 10

INVENTOR.
LELAND G. REED
BY Hazard & Miller
ATTORNEYS

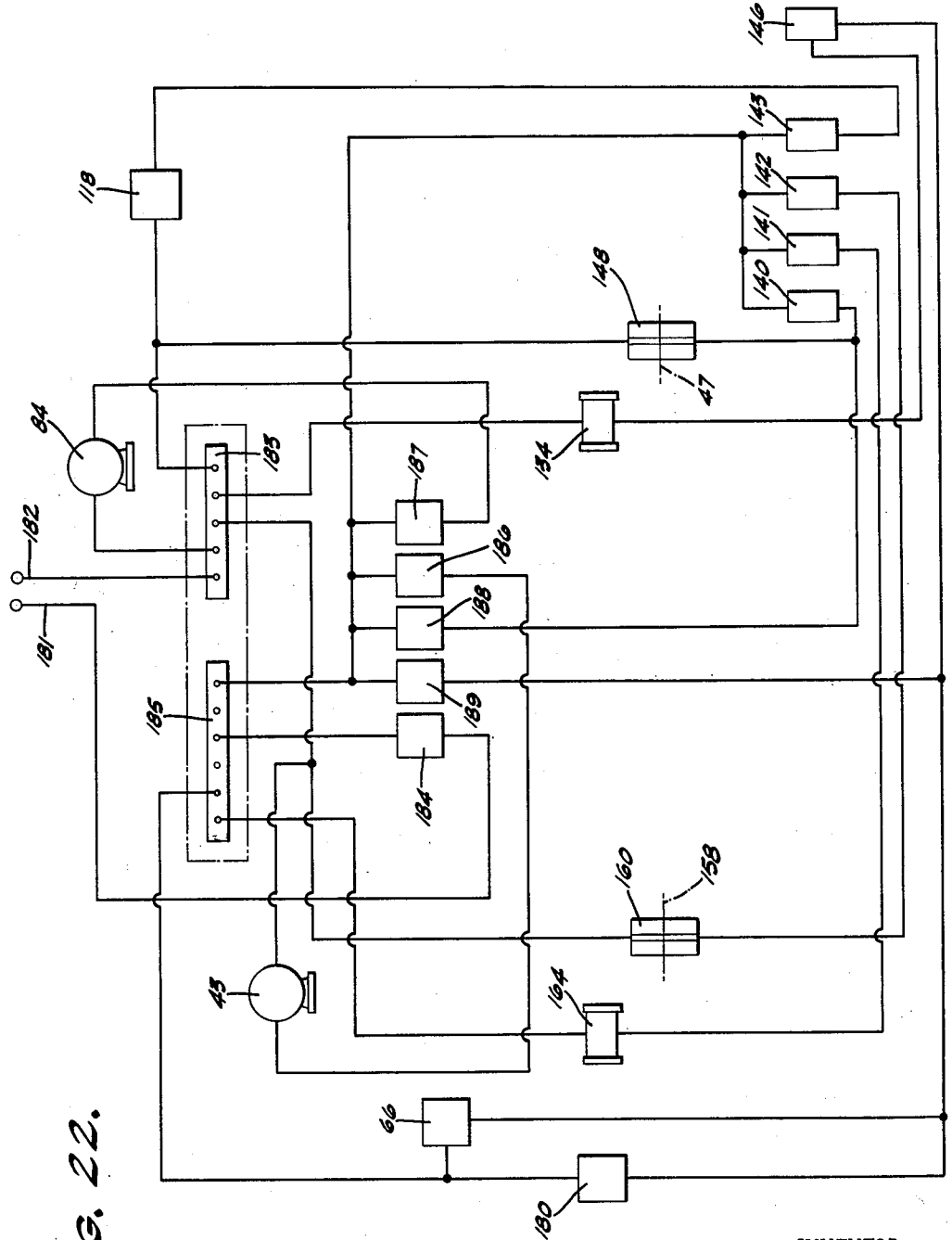

United States Patent Office 2,790,536
Patented Apr. 30, 1957

2,790,536

STORAGE BATTERY PLATES AND SEPARATOR ASSEMBLY MACHINE

Leland G. Reed, North Hollywood, Calif.

Application February 23, 1954, Serial No. 411,764

2 Claims. (Cl. 198—35)

This invention relates to improvements in machines for assembling plates and separators for storage batteries.

The conventional storage battery is composed of positive and negative plates separated from each other by separators and immersed in an electrolyte in a suitable container or battery box. In the usual storage battery there is one more negative plate than there is a positive plate, that is, in a nine-plate battery there are five negative plates and four positive plates, and in a fifteen-plate battery there are eight negative plates and seven positive plates.

Each negative plate has a lug at one upper corner thereof and each positive plate has a lug at the opposite upper corner thereof so that when the plates have been mutually assembled together with their separators, these lugs may be welted or "burned" together to electrically connect all negative plates together and electrically connect all positive plates together.

Heretofore the negative plates and positive plates and their intervening separators have usually been assembled by hand, although there have been a number of attempts to devise machines for assembling the plates and separators in proper order and arrangement. Such machines have not proven very satisfactory. Some machines involve sliding plates from stacks or sources of supply which is detrimental to the plates themselves in that each plate is in the form of a lead grid on which masses or "bricks" of lead oxide are mounted. Rough handling of the plates or sliding of one plate relatively to another is injurious to the lead oxide and may knock complete "bricks" out of the grids.

Many attempts to devise machines for assembling battery plates and separators as heretofore designed are incapable of supplying the additional negative plate or that plate which is in excess of the number of positive plates. They are likewise deficient in that they are incapable of being adjustable to optionally deliver a stack of plates and separators for a nine-plate battery, an eleven-plate battery, a thirteen-plate battery or a fifteen-plate battery.

A primary object of the present invention is to provide an improved machine for assembling storage battery plates and separators which will avoid sliding a plate from a stack or source of supply and which will deliver a stack having the plates and separators in proper order, in proper number, and in proper arrangement with each other.

In assembling plates and separators in proper order, I propose to remove negative plates, positive plates and separators from supply groups of the same by means of vacuum cups and to transfer the plates and separators to a moving belt in proper order so that they may be delivered therefrom into proper stacked relationship. As the lead oxide on the grids is somewhat coarse and in some instances "bricks" may be absent from the grids, the vacuum in the vacuum cups may be transmitted through the foremost plate to a plate on the stack or supply group that is immediately behind it.

It is important that only a single plate be removed from the supply group during each cycle of operation. In other words, the removal of two negative plates by the vacuum cup or the removal of two positive plates by the vacuum cup per cycle of operation is to be avoided as there should not be double negative plates or double positive plates in the completed battery in side-by-side relationship.

It is, therefore, another object of the invention to provide a means for assuring that only a single and foremost plate will be removed from its supply group during each cycle of operation of the machine so that each negative plate will be separated from an adjacent positive plate and vice versa by an intervening separator and there will be no double negative plates or double positive plates in the assembled group.

Another object of the invention is to provide a machine which will during normal cycles deposit in consecutive order on a moving belt a negative plate, a separator, a positive plate, and separator. These normal cycles of operation may be repeated optionally any number of times to supply separated negative and positive plates for a nine-plate, eleven-plate, thirteen-plate, fifteen-plate, or seventeen-plate battery, and after sufficient numbers of negative and positive plates have been deposited on the belt a concluding cycle of operation will cause the additional negative plate to also be automatically positioned on the belt, to thus supply the additional negative plate that is required in the conventional storage battery plate assembly.

Still another object of the invention is to provide a machine which is relatively simple in construction and which may be operated at relatively high speeds to produce the plate assemblies quite rapidly and which will assure that the positive plates, negative plates and separators will be arranged in their proper order and with the lugs in the upper corners of the negative and positive plates arranged in proper alignment.

With the foregoing and other objects in view, which will be made manifest in the following detailed description and specifically pointed out in the appended claims, reference is had to the accompanying drawings for an illustrative embodiment of the invention, wherein:

Fig. 2 is a view in front elevation of the machine;

Fig. 3 is a view in side elevation of the machine;

Fig. 4 is a horizontal section taken substantially upon the line 4—4 upon Fig. 2;

Fig. 6 is a vertical section taken substantially upon the line 6—6 upon Fig. 5 in the direction indicated;

Fig. 7 is a partial view in vertical section taken substantially upon the line 7—7 upon Fig. 5;

Fig. 8 is a vertical section taken substantially upon the line 8—8 upon Fig. 5 in the direction indicated, and illustrating parts in one position;

Fig. 9 is a view similar to Fig. 8, but illustrating the parts therein illustrated in another position;

Fig. 10 is a vertical section taken substantially upon the line 10—10 upon Fig. 5 in the direction indicated, and illustrating the parts in one position;

Fig. 11 is a view similar to Fig. 10, but illustrating the parts in another position;

Fig. 14 is a sectional view illustrating a detail of construction and may be regarded as having been taken upon the line 14—14 upon Fig. 21;

Fig. 15 is a partial view in vertical section taken substantially upon the line 15—15 upon Fig. 5 in the direction indicated;

Fig. 16 is a sectional view taken substantially upon the line 16—16 upon Fig. 4 in the direction indicated;

Fig. 17 is a partial view illustrating mechanism employed to effect a removal and deposit of what will be the last negative plate of a battery plate and separator group. This view may be regarded as having been taken upon the line 17—17 upon Fig. 3.

Fig. 18 is a sectional view taken substantially upon the line 18—18 upon Fig. 4;

Fig. 22 is a wiring diagram of electrical circuits in the machine.

Figure 5:
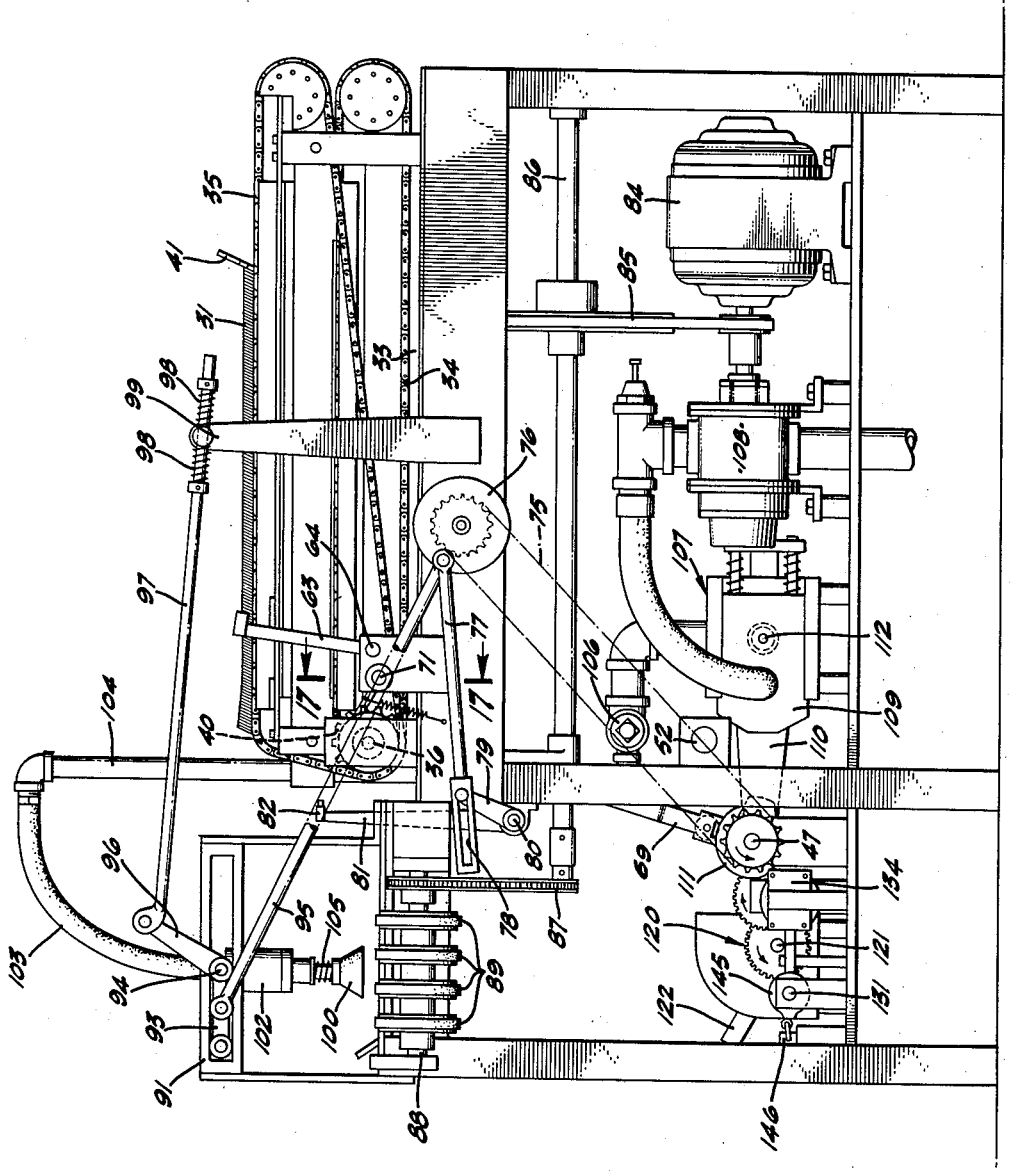
Fig. 5 is a view in front elevation of a portion of the machine, parts being broken away and shown in vertical section.

Referring to the accompanying drawings wherein similar reference characters designate similar parts throughout, the improved machine is designed to receive and support five rows or stacks of supplies. These supplies consist of one row 25 of negative battery plates having lugs 26 at one corner thereof, a row 27 of separators, a row 28 of positive plates having lugs 29 at another corner thereof, a row 30 of separators, and a row 31 of negative plates which have their lugs 32 at the lower corners thereof similar to the lugs 26. These rows of plates and separators are arranged upon and are supported on the upper reaches of lower endless chains 34 which ride upon rails 33. For each of the supply rows or stacks there are also upper endless chains 35, whose upper reaches are disposed some distance above the rails. All of the endless chains associated with each supply row pass over sprockets on short shafts 36 that are rotatably mounted on the frame of the machine adjacent the forward end of each row. Thus, as viewed in Fig. 5, the upper endless chains 35 which are associated with the supply row 25 are trained over sprockets 37 and 38 while the lower endless chains 34 are trained over sprockets 39 and 40 on the same shaft. In a similar manner, the endless chains both upper and lower that are associated with the supply row 27 are trained over sprockets on an adjacent shaft and the same is true of the chains for the supply rows 28, 30, and 31.

The supply rows are fed forwardly by means of followers 41. Each follower is in the form of a plate that may be positioned behind a supply row and which has downwardly extending lugs 42 at the sides thereof, see Fig. 7, which can be inserted in the links of the upper chains 35. These followers merely rest in an inclined position on the lower chains 34 so that as the chains are driven to cause the upper reaches of the upper and lower chains to move forwardly the follower 41 will cause the entire row or stack in advance thereof to move forwardly to a position wherein the forwardmost plate or separator, as the case may be, occupies a pickup station. As a means for driving the shafts 36 there is a motor 43, see Fig. 4, which drives through a gear reducer 44 an endless chain 45 which is trained over a sprocket 46 that is on a transversely extending shaft 47. On this shaft there is an eccentric 48, see Figs. 8 and 9, which is within an eccentric follower 49 carrying an arm 50 that is pivoted at 51 to a crank on a rocker shaft 52.

This rocker shaft has one crank 53 for each of the shafts 36 and a link 54 is pivotally connected thereto and to the lower end of a vertical slide 55 that slides within a bearing 56 on the frame and which has pivotally connected thereto a pawl 57. Each of the pawls is engageable with a ratchet wheel 58 on its respective shaft 36, and while the pawls are urged out of engagement with their ratchet wheels by means of weights 59 they may be forced into engagement with their ratchet wheels by arms 60 on triggers 61 that are disposed in the path of each row at the forward end thereof.

As the motor 43 may be assumed to be continuously driven the shaft 47 is likewise continuously driven and the eccentric 48 is effective to impart a rocking motion to the rocker shaft 52 which is converted into a vertical reciprocation of the rods 55. Considering the supply row or stack 25, if the forwardmost plate of this stack is behind the pickup position or station the trigger 61 is pulled forwardly by its tension spring 62, see Figs. 8 and 9, so that the arm 60 will engage the pawl 57 and force the pawl rearwardly into engagement with the ratchet wheel 58. As reciprocation of the rod 55 continues this pawl is effective to cause the shaft 36 to rotate with a step-by-step motion, thus rotating the sprockets for all of the chains associated with the row 25 and causing the upper reaches thereof to move the follower 41 forwardly. This advances the entire row forwardly until the forwardmost plate of this row engages the trigger 61 and forces it forwardly. When the trigger 61 is forced forwardly its arm 60 disengages the pawl 57 and the weight 59 is consequently effective to cause the pawl to disengage the ratchet wheel 58. This interrupts or stops further forward movement of the stack or supply row 25 even though reciprocation of the rod 55 continues. As plates are withdrawn or removed from the forward end of the stack 25 the trigger 61 may return to a position shown in Fig. 8, causing the pawl 57 to re-engage the ratchet wheel 58 and thus cause the supply row to again be advanced until its forwardmost plate occupies the pickup position or pickup station. When this occurs the pawl is caused to again disengage the ratchet wheel 58 as depicted in Fig. 9 and the drive is interrupted. Each of the supply rows whether they be of negative plates, separators, or positive plates is equipped with a similar drive mechanism off of the rocker shaft 52. Consequently, each mechanism functions independently of the other and each shaft 36 will be rotated with a step-by-step motion only so long as the forwardmost plate or separator of its supply row is behind its pickup station. When the forwardmost plate or separator, as the case may be, reaches its pickup position or station its trigger 61 will be swung forwardly causing the drive for its advance to be disconnected. In this manner, each supply row will be moved forwardly until its forwardmost plate or separator is at the desired pickup station, and as the plates or separators are removed the various supply rows will then be advanced to maintain the same relationship.

As supply rows become depleted from time to time their followers 41 can be lifted to disengage the lugs 42 from the upper chains, shifted backwardly and caused to re-engage the chains and additional plates or separators, as the case may be, can be positioned between the followers 41 and the remainders of the supply row that is on the machine.

As a means for preventing operation of the machine at a time when any supply row has become depleted there is an arm 63, see Fig. 7, that is disposed in the path of each of the followers 41. This arm is pivoted at 64 and carries a cam 65 engageable with a roller on a limit switch 66. This limit switch, when actuated, is effective to cause solenoid 134 to disengage clutch 132, see Fig. 4, and thus stop rotation of a timing shaft as will be hereinafter described. When the timing shaft is stopped, operation of the machine is discontinued when any supply row is about to become depleted to the extent of nearing complete exhaustion.

Figure 12:
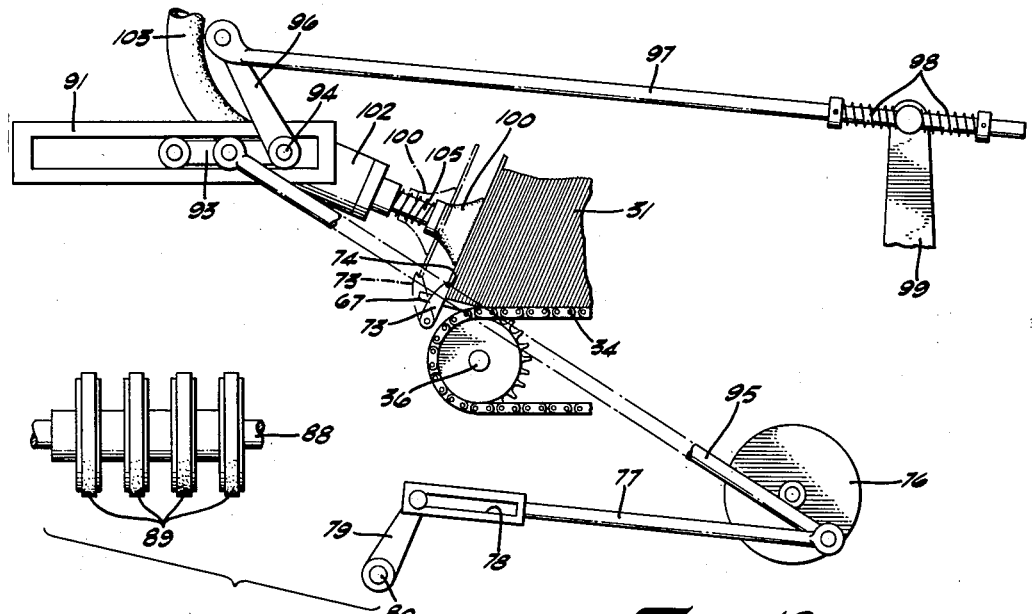
Fig. 12 is a skeleton view illustrating parts used to effect a removal of plates and separators from their respective supply rows or stacks.
Figure 13:
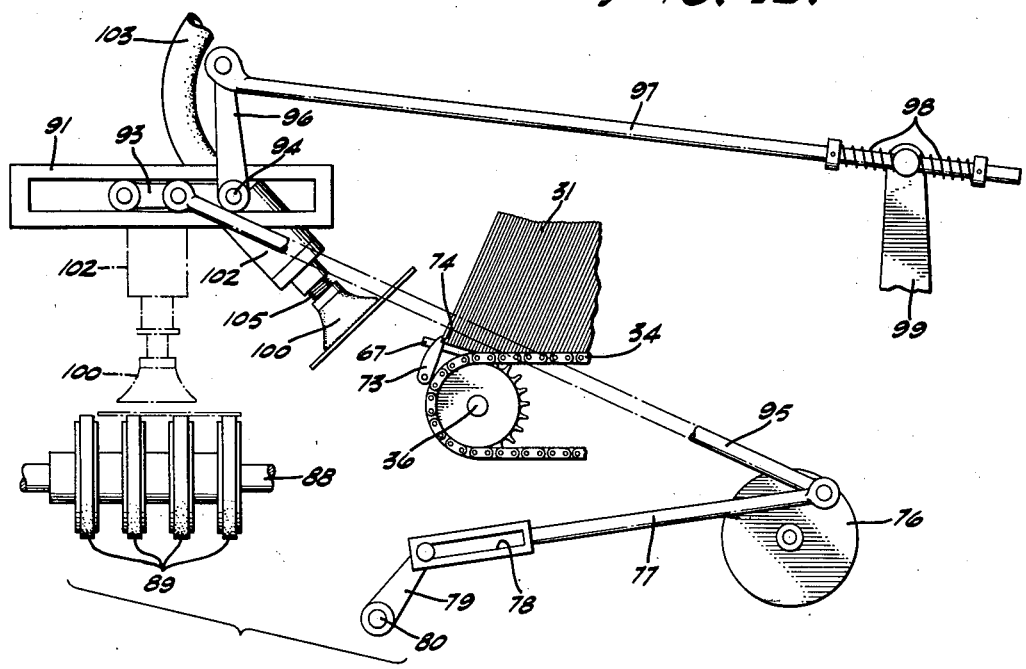
Fig. 13 is a view similar to Fig. 12, but illustrating the plates and separators in the process of being removed and deposited on a conveyor belt.
Figure 19:
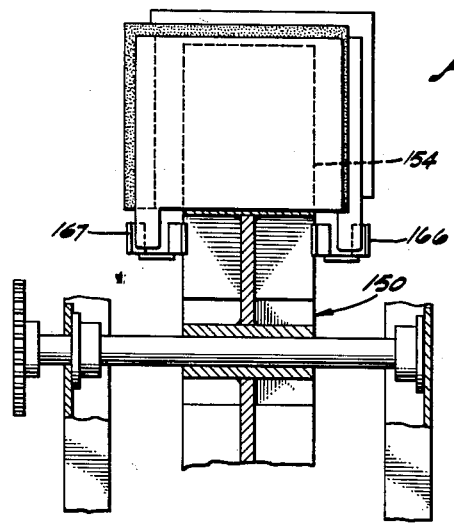
Fig. 19 is a view taken substantially upon the line 19—19 upon Fig. 2.

Near the forward ends of the rails 33 there are upwardly inclined plates 67, see Figs. 12 and 13, so that the foremost plates and separators of the respective rows are lifted clear of the endless chains as they approach the pickup positions. On the shaft 47 there is a cam 68 and a cam follower 69 which is pivotally connected to a crank 70 on a transversely extending rocker shaft 71. This rocker shaft carries cranks 72 which extend forwardly beneath the forward end of each row of plates. Each of the cranks 72 carries at its forward end a spring-actuated pawl 73 urged into engagement with the foremost plate. These pawls have notches 74 at their upper ends, the widths of which are substantially equal to the thicknesses of the plates. As the shaft 47 rotates it will be appreciated that a reciprocatory movement will be imparted to the cam follower 69 which will cause the rocker shaft 71 to oscillate and cause the pawls 73 to engage and lift the plate that is in the pickup position of each row from the position shown in Fig. 10 and lifted to the position shown in Fig. 11.

As a means for holding the subjacent plate or that plate which is immediately behind the elevated plate in Fig. 11 in position on the row, there is a chain drive 75, see Fig. 3, between the end of the shaft 47 and a disk 76 rotatably mounted on the frame of the machine. This disk has a pitman 77 pivotally connected thereto that has a slotted connection 78 with a crank 79 on a transversely extending rocker shaft 80. The rocker shaft 80 carries crank arms 81 having rubber tipped heads 82. The crank arms 81 are thus caused to be periodically moved rearwardly into engagement with the subjacent plates of their respective rows or plates and the timing is such that the engagement between the heads 82 and subjacent plates occurs after the foremost plates have been elevated by their pawls 73, see Fig. 15. In this manner although the foremost plates of each plate row are lifted by the pawls 73 into their pickup positions, the remaining plates of each plate row are mechanically held by the cranks 81 against removal or displacement while the foremost plate is being removed. After the foremost plate has been removed the cranks 81 swing forwardly to disengage their respective rows while the pawls 73 are being lowered to engage another plate on each row and lifted into its pickup position.

Figure 1:
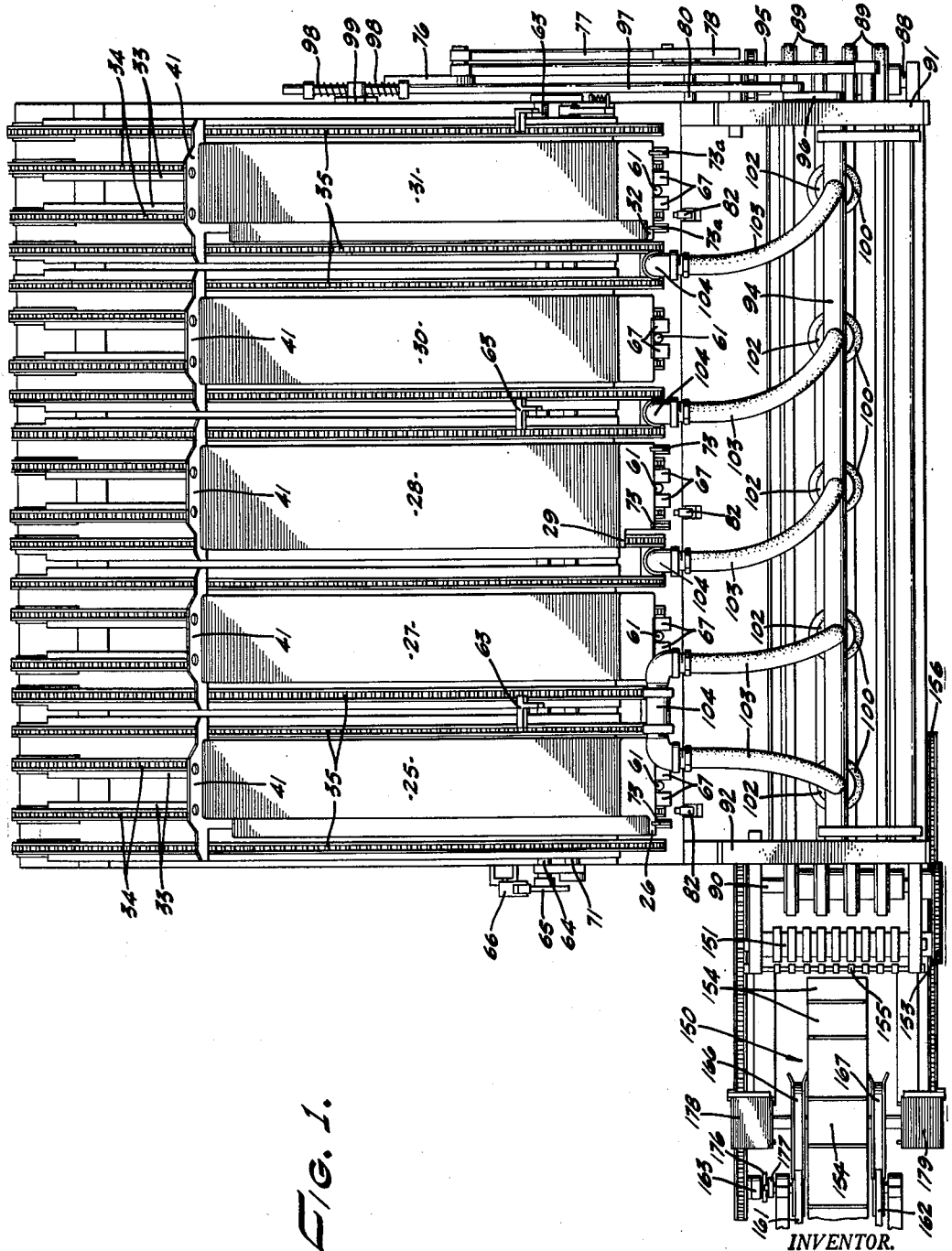
Figure 1 is a top plan view of the storage battery plate and separator assembling machine embodying the present invention.

A motor 84, see Fig. 3, is mounted on the frame of the machine and has a belt drive 85 with a longitudinally extending shaft 86. This shaft has a chain drive 87 with a shaft 88 on which pulleys are mounted and over which endless belts 89 are trained. These belts, which are also trained over pulleys on a shaft 90, see Fig. 1, form an endless conveyor the top reach of which is moving from right to left as viewed in Fig. 1. The plates and separators are to be removed from the forward ends of their respective rows and deposited on the top reach of this endless conveyor. To this end, over the ends of the endles conveyor there are slotted supports 91 and 92, in the slots of which slides 93 are reciprocable. These slides rotatably support a rocker shaft 94 that extends therebetween over the endless conveyor. The slides 93 are reciprocated in their supports by a pitman 95 which is pivotally connected thereto and to the same pin on the disk 76 to which the pitman 77 is pivotally connected. Consequently, as the disk 76 rotates the slides 93 will be caused to horizontally reciprocate in their slotted supports 91. The end of the rocker shaft 94 is equipped with a crank 96 that is pivotally connected to an arresting rod 97. This arresting rod is yieldably supported as by springs 98 on a stationary arm 99 mounted on the frame of the machine. Consequently, as the slides 93 reciprocate the crank 96 will have its upper end held stationary or substantially so by the arresting rod 97 and oscillation of the rocker shaft 94 is caused to occur. The rocker shaft carries a plurality of vacuum cups 100, there being one vacuum cup for each of the rows 25, 27, 28, 30 and 31. Each vacuum cup 100 has a hollow stem on which there is a head 101 that is reciprocable in a cylinder 102 mounted on the rocker shaft 94. Each cylinder 102 is connected through the rocker shaft 94 to a flexible hose 103 and these hoses in turn are connected to pipes 104. The rubber vacuum cups 100 are urged into their forwardmost positions by compression springs 105. The pipes 104 for the vacuum cups that are opposite the forward ends of the rows 25, 27, 28 and 30 are connected to a manifold 106, see Fig. 2, and this manifold is connected through a slide valve, generally indicated at 107 to a vacuum pump 108 which is driven by the motor 84. The slide 109 of the slide valve is reciprocated by a cam follower 110 driven by a cam 111 on the shaft 47. In one position of the slide valve the manifold 106 is connected to atmosphere through the port 112, but in the other position of the slide valve the manifold is connected through the port 113 to the vacuum pump 108.

It will be appreciated that the slides 93 will reciprocate in timed relation to the shaft 47 and as they reciprocate the vacuum cups 100 will swing from the position shown in Fig. 3 into the positions as illustrated in Fig. 11 wherein they engage the foremost plates and separators of the rows 25, 27, 28, 30 and 31. When the vacuum cups are urged against the forwardmost plates and separators by the slides 93 the compression springs 105 may heel. At this time the slide 109 of the slide valve 107 shifts to connect the manifold 106 with the vacuum pump 108 so that vacuum is developed within the cylinders 102. This causes the plates and separators that are engaged by the vacuum cups 100 to adhere to their respective vacuum cups.

The heads 101 may function as pistons which under the effect of the vacuum move from the full line position shown in Fig. 11 into the dotted line position. This effects a removal or pickup of the forwardmost plates and separators from their respective rows. Consequently, the forwardmost plates and separtors can be simultaneously removed from their respective rows and transported by the vacuum cups to a position overlying the endless conveyor belts 89. When the vacuum cups return to the position shown in Fig. 3 the slide 109 of the slide valve returns to the position shown in Fig. 4, wherein the manifold 106 is again connected to atmosphere. When atmospheric pressure is returned to the cylinders 102 the springs 105 are effective to lower the vacuum cups as far as permitted by the heads 101 in the cylinders 102 and the breaking of the vacuum causes the plates and separators that have thus been transported by the vacuum cups to be dropped onto the endless conveyor belts 89.

During normal operation only the plates and separators that are at the forward ends of the rows 25, 27, 28 and 30 are removed and deposited on the conveyor belt. Consequently, there will be one negative plate removed from the row 25 and deposited on the conveyor belt at its extreme left end as viewed in Fig. 1. Behind this plate or to the right of this plate as viewed in Fig. 1 there will be deposted one separator obtained from the row 27. Behind this separator are to the right of this separator as viewed in Fig. 1 there will be deposited on the conveyor belt one positive plate obtained from the row 28. Behind this positive plate or to the right of this plate as viewed in Fig. 1 there will be deposited a separator from the row 30. These plates and separators will consequently be positioned on the conveyor in proper sequence, that is, a negative plate followed by a separator followed by a positive plate followed by a separator, and these plates and separators will be discharged from the conveyor belt in proper sequence, thus providing two plates and separators therefor of the battery.

If a fifteen-plate assembly is desired the cycle of operation above described would be repeated seven times. Each deposit of a plate from the row 25, however, would not occur until after a separator from the row 30 had been carried by the endless conveyor belts 89 to the end of the conveyor and discharged therefrom. During the last or seventh cycle of operation in the illustration above given, a negative plate from the row 31 is also removed and deposited on the endless conveyor belts 89. This last negative plate, together with the seven negative plates from the row 25 and the seven positive plates from the row 28 would thus supply the fifteen plates of a fifteen-plate battery assembly. Each plate would be separated from its neighbor by a separator obtained from the rows 27 and 30. It will be appreciated that if only an eleven-plate assembly is desired the cycle of operation to remove plates and separators from the rows 25, 27, 28 and 30, would only be repeated five times and on the fifth cycle of operation a negative plate is removed from the row 31, thus completing the assembly of eleven plates separated from each other by separators.

As a means for removing the last plate of a group which is obtained from the row 31 of positive plates, the rocker shaft 71 is divided and has an extension 71a which is disposed beneath the row 31. The extension 71a can be coupled to or uncoupled from the rocker shaft 71 by a clutch 115, see Fig. 17. The extension 71a carries cranks 72a which are similar to the cranks 72 and the spring-actuated pawls 73a which are similar to the pawls 73 will function to lift the foremost plate of last row 31 in the same manner that the pawls 73 function. These cranks 72a and the pawls 73a are of course only actuated when the clutch 115 is engaged to connect the extension 71a to the rocker shaft 71.

The clutch 115 is shifted by a clutch shifter or yoke 116 and is normally urged out of engagement by a tension spring 117. A solenoid 118, when energized, overcomes the tension of the tension spring 117 and causes the clutch to engage, thus causing the pawls 73a to engage and lift the foremost plate of the row 31 simultaneously with the lifting of the foremost plates from the rows 25 and 38.

The solenoid 118 also is effective to shift the slide of a slide valve 119, one side of which slide valve is connected to the vacuum pump and the other side of which is connected to the piping and hose leading to the vacuum cup 100 which is in front of the row 31. Consequently, it will be appreciated that when the solenoid 118 is energized that it is effective to cause the pawls 73a to lift the foremost plate from the row 31 and also to connect the vacuum cup in front of this row to the vacuum pump and render the vacuum cup operative to effect a transfer of the foremost plate from the row 31 to the conveyor belt. As above explained, however, the solenoid 118 is normally not energized while plates and separators are being removed from the rows 25, 27, 28, and 30, and it is only after a sufficient number of plates and separators have been removed and deposited on the conveyor belt from the rows 25, 27, 28 and 30 that the removal of the last plate from the row 31 takes place to complete the group or assembly.

The slide valve 119 is similar in construction to the slide valve 107 and whenever its slide is shifted into the off position the slide communicates the vacuum cup in front of the row 31 with atmosphere so that plate may fall from the vacuum cup onto the conveyor belt.

To enable the adjustment of the machine for the purpose of producing optionally groups of eleven, thirteen, fifteen, and seventeen plates there is a gear train 120, see Fig. 4, which drives from the shaft 47 to a countershaft 121 of a speed-change transmission. A shifting yoke 122 carries a pinion 123, see Figs. 4 and 16, which is splined or slidably keyed to the countershaft and through an idler gear 124 drives a pinion 125. The pinion 125 may be shifted by the yoke 122 to optionally engage any of the gears 126, 127, 128, or 129 so as to rotate a driven shaft 130 on which these gears are mounted at various speeds. While I have merely shown four gears 126, 127, 128 and 129 and can thus obtain four different speeds of the driven shaft 130, it will be appreciated that the number of speeds of the driven shaft my be either increased or decreased by adding to or subtracting from the number of gears that are keyed to the driven shaft 130.

The driven shaft 130 drives a timing shaft 131 through a clutch 132 that is normally urged into engagement by a compression spring 133. This clutch can be disengaged by a yoke which is actuated by a solenoid 134. On the timing shaft 131 there is slidably keyed a cam sleeve 135, see Figs. 4 and 18. This sleeve has four groups of cams thereon which groups are respectively indicated at 136, 137, 138, and 139. The limit switches 140, 141, 142, and 143 are associated with the cam groups, respectively, and their rollers or cam followers are arranged to engage one of the cams of each cam group. The cam sleeve 135 is longitudinally shiftable on the timing shaft 131 by a shifter 144 so that by the adjustment of this shifter on the cam groups 136, 137, 138, and 139 may be simultaneously shifted with relation to their limit switches to position the proper or desired cam of the cam group opposite the followers of the limit switches. In addition to the cam sleeve 135 and the cam groups thereon, the timing shaft 131 carries a cam 145 which operates a limit switch 146. On each of the cam groups 136, 137, 138, and 139 there are cams of different lengths, see Fig. 18. The forward or advance ends of the cams commence or begin on the same longitudinal line as indicated at 147. However, the lengths of these cams vary as shown on Fig. 18 to compensate for the different speeds at which the timing shaft 131 may be driven by the speed-change transmission. In this manner, although the yoke 122 may be shifted to vary the speed of rotation of the timing shaft 131, by shifting the cam sleeve 135 by the shifter 144, a proper timing relationship will be maintained with respect to the limit switches that is accomplished by positioning the proper cam of the cam groups opposite the followers or actuators of the limit switches.

In the shaft 47 there is a magnetic clutch 148 which is electrically connected to the limit switch 140, see Fig. 22. Engagement of this clutch is necessary to drive the cam 111 and thus shift the slide valve 107. Unless the slide valve is operated by the cam 111 no vacuum is supplied to any of the vacuum cups 100. It will also be appreciated that unless the magnetic clutch 148 is engaged that the chain drive 75 is not actuated and the slides 93 are not reciprocated. The limit switch 140 is closed during the period that its follower engages the cam sleeve 135 and is opened only during the period that its follower engages one of the cams of its cam group on the sleeve. In the case of limit switches 141, 142, and 143, the arrangement is reversed. That is, these switches are opened when the followers engage the cam sleeve and are closed only during the periods that their followers engage the cams thereon. It will thus be appreciated that during the major portion of a rotation of the timing shaft 131 that the magnetic clutch 148 will be engaged because of the closing of the limit switch 140 by one of the cams of the cam groups 136. During the period that the cam of the cam group 136 is opening the limit switch 140, the magnetic clutch 148 will be disengaged and during this period there will be a dwell in the operation of the machine insofar as removal of plates and separators from the rows and their deposit on the endless conveyor belts 89 is concerned.

The plates and separators which have been deposited on the endless conveyor belts 89 by the vacuum cups 100 are carried by the endless conveyor belts in proper sequence toward a spider 150. As the plates and separators leave the conveyor belts 89 they are caused to pass between upper and lower rolls 151 and 152. The lower roll is driven by a chain 153 off of the shaft 90. The upper roll 151 rests by gravity on a plate or separator as the case may be, that passes between the rolls and tends to hold the plate or separator horizontal in the course of its movement from the end of the conveyor belts 89 to the U-shaped receivers or holders 154 that are radially arranged on the spider.

Immediately behind the upper roll 151 there is a small roll 155 the ends of which are in vertical slots in supporting brackets. This roll functions primarily to direct the separators downwardly after they have passed between the rolls 151 and 152. As the separators are usually quite light, these separators have a tendency to float and the roll 155 will direct the separator downwardly into the holder or receiver 154 that is in the position to receive the plates and separators. Thus, although a separator may be immediately followed by a plate the downward depressing of the separator causes the separator to move into a position that will be below an oncoming plate that is being delivered between the two rolls 151 and 152 from the conveyor belt 89. The spider 150 is rotated with a step-by-step motion by means of a chain drive 156. This chain is driven by a sprocket 157 on a shaft 158 that is driven by miter gearing 159 off of shaft 47. It includes a magnetic clutch 160 and this magnetic clutch is in series with the limit switch 142 which is operable by one of the cams of the cam group 138. The length of time that the limit switch 142 is closed by the cam of the cam group governs the time that the magnetic clutch 160 is closed and the time that the chain 156 is driven by shaft 47 to impart to the spider the step-by-step motion.

Behind the spider 150 there is an endless conveyor in the form of two spaced endless belts 161 and 162. The spacing between these belts is greater than the width of the holders or receivers 154 enabling the holders to pass therebetween. The spacing of the belts 161 and 162 however is not greater than the widths of the plates. The belts 161 and 162 are trained over pulleys on the ends of short shafts suitably journaled on a supporting structure and the shaft for the belt 161 has a one-revolution clutch 163 therein that is controlled by a solenoid 164. This shaft is continuously driven by a chain 165 off of the shaft 47 through the miter gearing 159. The purpose of this construction is to enable a holder 154 to deposit a stacked group of plates and separators on the conveyor belts 161 and 162 and then cause the one-revolution clutch 163 to impart a revolution to the pulley over which the belt 161 is trained, thus carrying the stack from within the holder 154 a short distance.

Figure 20:
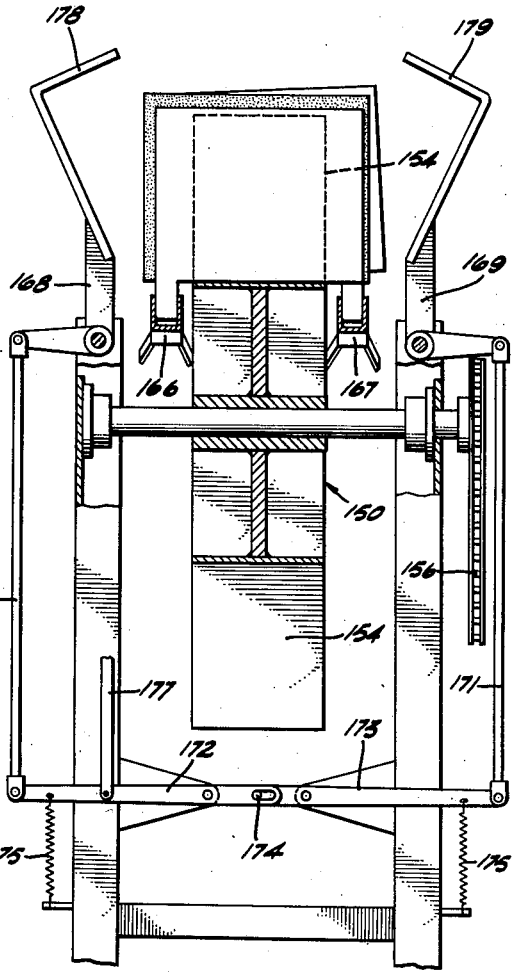
Fig. 20 is a sectional view taken substantially upon the line 20—20 upon Fig. 2.
Figure 21:
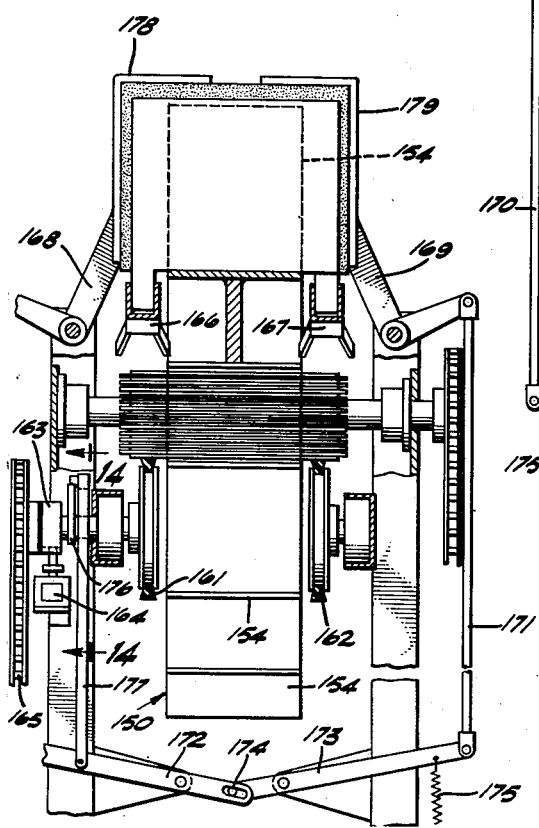
Fig. 21 is a view similar to Fig. 20, but illustrating the parts in another position.

It is desirable to align the lugs 26 of the negative plates and to align the lugs 29 of the positive plates, and to this end adjacent the sides of the spider there are troughshaped guides 166 and 167 through which the lugs are carried by the holders 154. It is also desirable to otherwise engage and align the plates and separators of an assembled group within each holder 154 by engaging the edges thereof. To this end, cranks 168 and 169 are pivotally mounted on the supporting structure of the machine and are arranged to swing inwardly towards each other opposite the ends of the topmost holder 154. These cranks are operated by links 170 and 171 which, in turn, are connected to mutually connected levers 172 and 173. These levers are mutually connected together by a pin and slot connection 174 and are urged into their lowermost positions by tension springs 175. When these levers are in their lowermost positions the cranks 168 and 169 are swung outwardly as illustrated in Fig. 20. Whenever the one-revolution clutch 163 is engaged it rotates an eccentric 176, see Figs. 14 and 21. A follower 177 in engagement with this eccentric will be lifted thereby and as this follower is connected to the lever 172 the cranks 168 and 169 will be swung inwardly towards each other from the position shown in Fig. 20 to the position shown in Fig. 21. At the upper ends of these cranks there are angular members 178 and 179 which are designed to fit against the ends and over the top of the stack of assembled plates and separators and cause the stack or assembled group to assume aligned positions before they are deposited on the endless conveyor belts 161 and 162. In this manner there will be delivered and deposited on the endless conveyor belts 161 and 162 successive stacks of assembled plates and separators and as the endless belts 161 and 162 are caused to move with a step-by-step movement during the periods when the one-revolution clutch 163 is engaged, these stacks will be arranged on the belts 161 and 162 in fairly close proximity to each other.

Near the end of the endless conveyor formed by the belts 161 and 162 there is a limit switch 180, see Fig. 22, which will be caused to close whenever the endless belts 161 and 162 have been so loaded with stacks that no more stacks are receivable thereon and the machine should consequently automatically stop operation.

Referring now to the wiring diagram on Fig. 22, 181 and 182 indicate the leads of an electric current supply. The lead 182 is connected directly to a terminal block 183. The lead 181 is connected through a manual switch 184 to another terminal block 185. This terminal block is connected through a manual switch 186 to the main drive motor 43 which, in turn, is connected to the terminal block 183. The vacuum pump motor 84 is connected from terminal block 183 through a manual switch 187 to the terminal block 185. In this manner, by opening the master switch 184 all connections between the two terminal blocks 183 and 185 are broken. If the manual switch 184 is closed, however, closing of the manual switch 186 causes the main motor 43 to function and in a similar manner, closing of manual switch 187 will cause the vacuum pump motor 84 to function.

The manual switch 188 is connected on one side to the terminal block 185 and on the other side to the magnetic clutch 148 which, in turn, is connected to the other terminal block. This manual switch 188 can be employed to manually energize the magnetic clutch 148 at any time desired. This is usually desired in initially setting the machine for proper timing. However, as the magnetic clutch 148 is also to be energized by the limit switch 140, this limit switch is connected in parallel thereto and around the manual switch 188. Consequently, if the manual switch 188 is open then the magnetic clutch 148 can only be energized by the closing of the limit switch 140 which occurs when its cam follower is off of a cam and is directly engaging cam sleeve 135. As previously explained this causes the slide valve 107 to be reciprocated and the chain drive 75 to operate the slides 93 until a cam of the cam group 136 opens the limit switch 140 thereby opening the magnetic clutch 148 and causing these operations to be temporarily suspended during a short period of dwell. The solenoid 134 that operates the clutch of the timing shaft 131 is connected to the terminal block 183 and through the limit switch 146 to the limit switches 66 and 180 which are arranged in parallel with each other. From these switches a connection is made to the terminal block 185.

The primary purpose of this connection is as follows:

It will be recalled that solenoid 134 which controls the clutch 132 on the timing shaft is normally deenergized and that the clutch is engaged by the compression spring 133. If one of the rows of plates or separators should become so badly depleted as to approach being exhausted, the limit switch 66 would be closed. However, it is highly desirable that instead of immediately energizing the solenoid 134 and consequently deenergizing clutch 132 which might stop the formation of a group of plates and separators in the middle of the formation of a group, that operations be continued until the group has been completed and that the machine then be stopped. Consequently, with the wiring as arranged, even though limit switch 66 is closed limit switch 146 will still remain open until it is closed by its cam 145 on the timing shaft 131. Consequently, the circuit will not be completed through the solenoid 134 and the clutch 132 will not be disengaged until the timing shaft 131 completes its revolution and a complete group of plates and separators is formed. When this occurs, the cam 145 closes limit switch 146, thus completing the circuit through the solenoid 134 and causing the clutch 132 to disengage. This discontinues rotation of the timing shaft 131 and the machine will consequently automatically stop at the completion of the mentioned group. It will remain stopped until the depleted row has been replenished and the limit switch 66 is again opened. When this switch is opened the circuit is broken through solenoid 134 and the spring 33 can again close the clutch so that the timing shaft 131 can be driven off of the speed-change transmission.

As the limit switch 180 which is at the end of the outlet conveyor formed by belts 161 and 162 is in parallel relationship with the limit switch 66 it is obvious that when the outlet conveyor has been completely loaded with stacks or groups of plates and separators that the closing of limit switch 180 will likewise not cause the machine to immediately stop but will prepare limit switch 146 so that when this switch closes at the conclusion of the formation of a complete group the machine will likewise automatically stop and remain stopped until the outlet conveyor is unloaded sufficiently to allow the limit switch 180 to open. The manual switch 189 is also in parallel circuit relationship with the limit switches 66 and 180 and when manually closed, this switch also is inoperative to stop operation of the machine until a complete group is formed and following which limit switch 146 closes and energizes the solenoid 134.

The limit switch 143 opposite the cam group 139 functions solely to close the circuit through the solenoid 118 which, through the operation of clutch 115 and the slide valve 119, causes the last plate from row 31 to be deposited on the belt.

With this explanation it will be appreciated that as long as limit switch 140 remains closed by the engagement of its follower or actuator with the cam sleeve 135 as distinguished from a cam thereon, plates and separators will continue to be removed from the supply rows 25, 27, 28, and 30. These removed plates and separators will be deposited on the endless conveyor belt 89.

If the speed of rotation of the timing shaft 131 is reduced it is apparent that the limit switch 140 will remain closed for a longer period of time, and consequently the number of consecutive removals of the plates and separators from the supply rows 25, 27, 28, and 30 will be increased. Conversely, if the speed of rotation of the timing shaft 131 is increased, the length of time that the limit switch 140 remains closed is reduced and the number of repeated removals of plates and separators from the supply rows 25, 27, 28, and 30 will likewise be reduced. This change in speed of rotation of the timing shaft consequently requires a corresponding change in the timing of the dwell interval which is governed by the length of the cams of the cam group 136. It also involves a changing of the timing when solenoid 118 is energized by the limit switch 143. Similarly, a change in the timing during which the magnetic clutch 160 is energized to rotate the spider 150 is required and a change in the timing when the one-revolution clutch 163 is also required. All of this change of timing is simultaneously accomplished by the shifting of the yoke 144, causing all of the cam groups on the cam sleeve to be shifted relatively to their limit switches simultaneously.

From the above-described construction it will be appreciated that an improved machine has been provided wherein the machine may be supplied with supply rows of negative plates, separators, and positive plates. These plates and separators can be removed from the supply rows and deposited on the conveyor belt 89 in proper sequence and with varied numbers, depending upon whether an eleven-plate, thirteen-plate, fifteen-plate, or seventeen-plate group is desired. After the proper even number of negative and positive plates, together with intervening separators has been deposited on the belt a final negative plate is automatically deposited thereon from the supply row 31. From the belts 89 the plates and separators are stacked one upon the other in proper order within a holder 154 wherein they are aligned with each other with the lugs on the negative plates aligned with each other and the lugs on the positive plates likewise aligned with each other. The stack is then delivered in aligned relationship on the outlet conveyor formed by the belts 161 and 162. From this outlet conveyor the stack can be removed and the lugs of the negative plates burned together and the lugs of the positive plates burned together and the entire assembly installed in a suitable battery box.

Various changes may be made in the details of construction without departing from the spirit and scope of the invention as defined by the appended claims.

I claim:

1. A battery plate and separator assembling machine comprising means for supporting supply rows of negative plates, separators, positive plates, separators and negative plates in the order named, a conveyor belt transverse thereto, means for transferring plates and separators from the first four supply rows to the belt a plurality of times and then transferring a negative plate from the fifth row to the belt, a spider rotatably supported at the end of the belt having receiving holders each of which is adapted to receive the plates and separators consecutively from the belt, means for rotating the spider with a step-by-step rotation so as to position the receiving holders consecutively opposite the end of the belt, a discharge conveyor belt arranged opposite the spider and on which the plates and separators in the receiving holders may be positioned, and means for driving the discharge conveyor with a step-by-step movement in timed relation to the spider so that the discharge conveyor moves during periods that the spider is stopped.

2. A battery plate and separator assembling machine comprising means for supporting supply rows of negative plates, separators, positive plates, separators and negative plates in the order named, a conveyor belt transverse thereto, means for transferring plates and separators from the first four supply rows to the belt a plurality of times and then transferring a negative plate from the fifth row to the belt, a spider rotatably supported at the end of the belt having receiving holders each of which is adapted to receive the plates and separators consecutively from the belt, means for rotating the spider with a step-by-step rotation so as to position the receiving holders consecutively opposite the end of the belt, a discharge conveyor belt arranged opposite the spider and on which the plates and separators in the receiving holders may be positioned, means for driving the discharge conveyor with a step-by-step movement in timed relation to the spider so that the discharge conveyor moves during periods that the spider is stopped, and means for stopping the depositing of plates and separators on the first-mentioned belt when the discharge conveyor has been completely loaded but only after a complete assembly of plates and separators has been completed.

References Cited in the file of this patent

UNITED STATES PATENTS 420,194     Gauchot               Jan. 28, 1890

(Other references on following page)

UNITED STATES PATENTS

| | | |
|---|---|---|
| 1,586,544 | White | June 1, 1926 |
| 1,901,062 | Sharkey | Mar. 14, 1933 |
| 2,038,306 | Patrick | Apr. 21, 1936 |
| 2,069,397 | Von Barth | Feb. 2, 1937 |
| 2,161,124 | Babicz | June 6, 1939 |
| 2,324,523 | Lund | July 20, 1943 |
| 2,362,134 | Honig | Nov. 7, 1944 |
| 2,568,248 | Nichols et al. | Sept. 18, 1951 |
| 2,596,386 | Egge | May 13, 1952 |
| 2,624,106 | Lund | Jan. 6, 1953 |
| 2,626,038 | Smith | Jan. 20, 1953 |
| 2,652,933 | Willard et al. | Sept. 22, 1953 |
| 2,680,510 | Donath | June 8, 1954 |
| 2,704,593 | Galloway | Mar. 22, 1955 |